United States Patent
De' Longhi et al.

(10) Patent No.: US 10,555,375 B2
(45) Date of Patent: Feb. 4, 2020

(54) ELECTRIC APPARATUS FOR COOKING AND/OR HEATING FOOD

(71) Applicant: DE' LONGHI APPLIANCES SRL CON UNICO SOCIO, Treviso (IT)

(72) Inventors: Giuseppe De' Longhi, Treviso (IT); Daniele Beninato, Mestre (IT)

(73) Assignee: DE' LONGHI APPLIANCES S.R.L. CON UNICO SOCIO, Treviso (IT)

( * ) Notice: Subject to any disclaimer, the term of this patent is extended or adjusted under 35 U.S.C. 154(b) by 477 days.

(21) Appl. No.: 15/261,673

(22) Filed: Sep. 9, 2016

(65) Prior Publication Data

US 2017/0079090 A1 Mar. 16, 2017

(30) Foreign Application Priority Data

Sep. 11, 2015 (IT) .................... 102015000050713

(51) Int. Cl.
*H05B 1/02* (2006.01)
*F24C 7/08* (2006.01)

(52) U.S. Cl.
CPC ........... *H05B 1/0263* (2013.01); *F24C 7/088* (2013.01); *H05B 1/0261* (2013.01)

(58) Field of Classification Search
CPC ............... H05B 1/0261; H05B 1/0263; H05B 2213/07; F24C 7/088; F24C 7/08; F24C 7/087; F24C 7/085; F24C 7/081; G05D 23/1919; G05B 11/42; G05B 2219/2613; G05B 2219/2643

See application file for complete search history.

(56) References Cited

U.S. PATENT DOCUMENTS

| | | | | |
|---|---|---|---|---|
| 5,973,300 A | * | 10/1999 | Tomohiro ............ | H05B 6/6452 219/497 |
| 2007/0084849 A1 | * | 4/2007 | Smith ....................... | F24C 7/08 219/413 |
| 2015/0354827 A1 | * | 12/2015 | Faraldi ..................... | A21B 3/04 426/510 |

* cited by examiner

*Primary Examiner* — Shawntina T Fuqua
(74) *Attorney, Agent, or Firm* — Marshall, Gerstein & Borun LLP

(57) ABSTRACT

Electric apparatus for cooking and/or heating food includes a chamber to receive food, electric heating elements associated with said chamber, at least one temperature sensor to measure a temperature in the chamber, and a temperature control device provided with a control and power supply unit configured to receive the temperature measured by the sensor and compare it with a desired temperature in a central zone of the chamber. The temperature control device may also comprise at least one estimator filter configured to receive at entrance: the temperature detected, the actual power supplied to the electric heating elements by said control unit and the data relating to previous temperature estimations and able to supply at exit an estimated temperature, wherein said control unit is configured to use the estimated temperature transmitted by the estimator filter to establish the correct mean power to be supplied by the electric heating elements.

10 Claims, 4 Drawing Sheets

ELECTRIC APPARATUS FOR COOKING AND/OR HEATING FOOD

FIELD OF THE INVENTION

The present invention concerns an electric apparatus for cooking and/or heating food, and the corresponding temperature control method and device for said electric apparatus.

The following description will refer by way of example in particular to electric ovens for cooking and/or heating food, but the embodiments described here can also be applied for other electric cooking apparatuses, for example fryers or others.

BACKGROUND OF THE INVENTION

In the domestic field it is known to use electric ovens for preparing and cooking food. Such electric ovens generally comprise a box-like body with an opening and closing door, an internal base to support the food to be prepared, and heating elements, for example electric resistances controlled by relays or TRIAC. Such electric heating elements can be positioned both on the high part of the oven and also on the lower part, or laterally.

The ovens are provided with a control unit to manage the cooking times and temperatures, according to the type of cooking chosen by the user by means of a suitable interface.

To control the temperature of the oven, a sensor to detect the temperature is usually provided, located on an internal wall of the oven. An example of an oven provided with a control system that includes a temperature sensor within the cooking cavity is disclosed in US 2007/084849.

A first limit of known electric ovens is precisely the position of the temperature sensor, since the temperature that one wants to measure and estimate inside an oven is the one in the central zone of the oven, where the food is actually cooked or prepared, while the detection sensor is situated in the lateral wall. In short therefore, the desired temperature set by the user according to the type of cooking required, which is also the one that should be kept constantly controlled, is different from the temperature actually measured.

Another limit of known electric ovens lies in the way they control and regulate the internal temperature. In fact, known electric ovens usually have an ON-OFF drive with regard to the power to be supplied to the electric heating elements and the temperature is regulated by mechanical or electronic hysteresis systems.

In mechanical hysteresis regulation, two temperature thresholds are set, a maximum and a minimum, therefore the temperature sensor located on the lateral wall of the oven measures a certain temperature which is compared with the two thresholds. The oven supplies maximum power until a temperature value is reached, usually higher than the one set as maximum, and then switches off. Then, when a temperature lower than the desired temperature is detected, the oven switches itself on again to increase the temperature to the desired value. The power is therefore sized for rapid heating and not for maintaining a constant temperature.

In electronic hysteresis regulation, a maximum temperature threshold and a minimum temperature threshold are also set in the oven, and in this case the electronic regulation part allows to reduce the minimum difference between the two thresholds.

In both regulation systems, mechanical or electronic hysteresis, there are in any case problems relating to delays in measuring and intervening of the system to regulate the temperature, gross errors in evaluating the temperature and often too high powers are supplied.

In both types of functioning therefore, whether electronic or mechanical hysteresis, there are unwanted oscillations in the developments of the temperature over time, and hence of the temperature desired at the center of the oven. For example in the case of mechanical hysteresis, a difference in temperature of about 10° C. on the temperature sensor located on the wall of the cooking chamber leads to a difference of about 40° C. at the center of the oven. As we said, in the case of electronic hysteresis this difference is reduced, but it is still considerable.

Another problem of known electric ovens is that it is difficult to keep the temperature in the cooking chamber substantially constant and at a predetermined value; this makes it very complicated to cook food at relatively low temperatures, for example below 100° C., without running the risk of degrading the food or of obtaining an approximate cooking. In fact, one should remember that, in known ovens, the lower the operating temperature, the greater the oscillations in mean temperature.

WO 2013/063691 discloses a method of controlling a heat-generation element to control a temperature within a space, which provides to use a sensor for detecting an initial temperature, to supply electric current at a maximum output power for a period of time, to detect a second temperature at the end of the period of time, to determine a first temperature difference between the initial temperature and the second temperature, to determine a maximum error between a sensed temperature at a selected time and an ambient temperature based on a pre-determined relationship between the first temperature difference and the maximum error.

However, the solution proposed in this document does not solve the above-mentioned problems, and particularly those related to the unwanted oscillations in the developments of the temperature over the time.

There is therefore a need to perfect an electric apparatus for cooking and/or heating food, and a corresponding temperature control method and device for said electric apparatus, which can overcome at least one of the disadvantages of the state of the art.

In particular, one purpose of the present invention is to make available an electric apparatus for cooking and/or heating food, and corresponding temperature control method and device for said electric apparatus which, although using a sensor for measuring the temperature which is positioned in a wall of the cooking chamber of the apparatus, is able to estimate and maintain a substantially constant temperature at the center of the cooking chamber, that is, in the zone where the user really wants to control and maintain a set temperature value.

Another purpose of the present invention is also to perfect a method to control the temperature of electric apparatuses for cooking and/or heating food which allows to optimize energy consumption of the electric apparatus and which allows to optimize the power supply steps also according to dynamic parameters and possibly also the construction parameters of the electric apparatus to be controlled.

Another purpose of the present invention is to perfect a temperature control method which allows to cook or prepare food in an electric apparatus even at low temperature both efficiently and completely, without any risk of causing damage to said food, for example for preparing yoghurt, for leavening, for cooking meat at low temperature, for cooking without losing water and others.

Another purpose of the present invention is to obtain a device for actuating the temperature control method in electric ovens.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

Embodiments described here concern an electric apparatus for cooking and/or heating food, comprising at least:
- a chamber able to receive food to be cooked and/or heated;
- electric heating elements associated with the chamber;
- at least one temperature sensor to measure a temperature in the chamber;
- a temperature control device provided with a control and power supply unit configured to receive the temperature measured by the sensor and compare it with a desired temperature in a central zone of the chamber.

In accordance with one embodiment, the temperature control device also comprises at least one estimator filter configured to receive at entrance the data relating to: the temperature detected in the chamber; the actual power supplied to the electric heating elements by the control unit and to receive on entrance the data relating to the previous temperature estimations, and able to supply at exit an estimated temperature.

Moreover, the control unit is configured to use the estimated temperature transmitted by the estimator filter to establish the correct mean power to be supplied by the electric heating elements in order to heat the cooking/heating chamber.

According to a variant embodiment, the estimator filter is a digital filter of the control signal polarized with the value of the temperature sensor.

According to another variant embodiment, the control unit can comprise a control circuit of the PID type and can comprise, possibly, a power regulation system with PWM drive. Alternatively, the control unit comprises a power regulator of the TRIAC type.

Other embodiments described here concern a temperature control device for an electric apparatus for cooking and/or heating food comprising a chamber able to receive food to be cooked and/or heated, electric heating elements associated with the chamber, and at least a temperature sensor to measure the temperature in the chamber.

The temperature control device is provided with a control and power supply unit configured to receive the temperature in the chamber measured by the sensor and to compare it with a desired temperature in a central zone of the chamber.

In accordance with one embodiment, the temperature control device also comprises at least one estimator filter configured to receive at entrance the temperature data relating to: temperature detected, the actual power supplied to the electric heating elements by the control unit and the data of previous temperature estimations. Moreover, the estimator filter is able to supply at exit an estimated temperature.

Moreover, the control unit is configured to use the estimated temperature transmitted by the estimator filter to establish the correct power to be supplied by the control unit to the electric heating elements.

Furthermore, other embodiments described here concern a method to control the temperature in electric apparatuses for cooking and/or heating food provided with electric heating elements, characterized by the following steps: setting a desired cooking temperature inside the electric apparatus; measuring the actual temperature inside the electric apparatus; detecting the actual power supplied by the electric heating elements; obtaining, by means of an estimator filter, a temperature in the central zone of the electric apparatus, starting from the data related to the actual measured temperature, the actual power supplied and the previous estimates of said estimated temperature; determining, based on the difference between the estimated temperature and the desired temperature, the power to be supplied by a control unit to the electric heating elements.

Advantageously, by means of the present temperature control method, it is possible to supply a precise and reliable estimation of the temperature at the center of the electric apparatus, on the basis of the temperature measurements carried out in the lateral area, of the average power supplied in a determinate moment to the electric heating elements and on the basis of previous evaluation cycles of the temperature, that is, in short, on the dynamics of the system. In this way, the errors due to approximate measures and evaluations of the temperature at the center of the electric apparatus are avoided or in any case greatly limited, the consumption of power is optimized and large oscillations of the temperature as a function of time are also avoided, thus compensating any delays in measurement.

According to another aspect of the invention, the mean power on an adequate time basis to be supplied by the control unit to the electric heating elements is determined by percentage values varying from 0 to 100.

Preferably, the power to be supplied to the electric heating elements is established at every estimation cycle of the estimated temperature.

In the estimation of the temperature constructive parameters of the electric apparatus can be considered, such as the internal geometry, the number and the positioning of the electric heating elements and others, such as for example the possible presence of insulating materials.

The various aspects and characteristics described in the present description can be applied individually where possible. These individual aspects, for example aspects and characteristics described in the attached dependent claims, can be the object of divisional applications.

It is understood that any aspect or characteristic that is discovered, during the patenting process, to be already known, shall not be claimed and shall be the object of a disclaimer.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
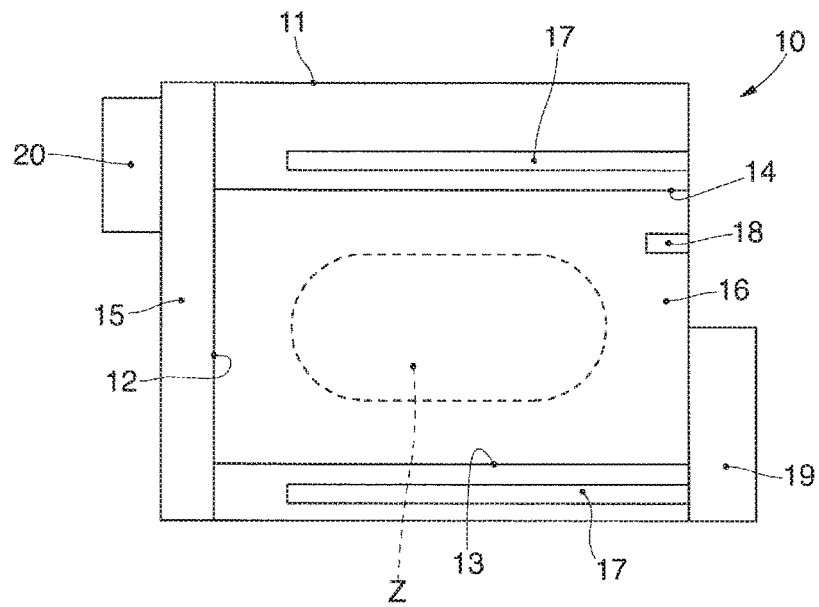
FIG. 1 is a schematic view of an electric apparatus for cooking and/or heating food.

We shall now refer in detail to the various embodiments of the present invention, of which one or more examples are shown in the attached drawing. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Embodiments described here using the attached drawings concern an electric apparatus 10 for cooking and/or heating food, comprising:
- a cooking and/or heating chamber 12, able to receive food to be cooked and/or heated,
- electric heating elements 17 associated with the chamber 12,
- at least one temperature sensor 18 to measure a temperature Tm in the chamber 12,
- a temperature control device 25 provided with a control and power supply unit 19 configured to receive the temperature Tm measured by the sensor 18 and compare it with a desired temperature Tz in a central zone Z of the chamber 12.

According to the present description, the temperature control device 25 also comprises at least one estimator filter 21 configured to receive at entrance, from the control unit 19, the data relating to: temperature Tm detected; actual power supplied to the electric heating elements 17 and to receive at entrance the data of previous temperature estimates and able to supply at exit an estimated temperature TtC.

According to the present description, moreover, the control unit 19 is configured to use the estimated temperature TtC transmitted by the estimator filter 21 to establish the corrected mean power to be supplied on an adequate time basis to the electric heating elements 17.

An electric apparatus 10 as used in association with the embodiments described here can be an electric oven, for cooking and/or heating food, or an electric fryer, or any other electric apparatus usable for cooking and/or heating food.

FIG. 1 is used to describe embodiments in which the electric apparatus 10 is an electric oven for preparing, cooking and/or heating food, which comprises a box-like body 11 inside which the chamber 12 is made, in which a cooking and/or heating zone Z is shown schematized by dashes, situated substantially in the central area of the apparatus 10. The chamber 12 is delimited by a base 13, a ceiling 14, an opening and closing door 15 and by lateral walls, of which the bottom lateral wall 16 is shown schematized in FIG. 1. In correspondence with the ceiling 14 and the base 13, in this case, the electric heating elements 17 are positioned, for example electric resistances. On one of the lateral walls, for example the bottom lateral wall 16, the at least one temperature sensor 18 is positioned, which therefore detects the internal temperature of the apparatus 10 near the lateral wall 16.

The electric apparatus 10 described using FIG. 1 is provided with the temperature control device 25, where the supply of power to the electric heating elements 17 is delegated to the respective control unit 19. In possible implementations, the electric apparatus 10 can also be provided with a user interface unit 20. By means of the interface unit 20, the user can set all the parameters that are normally set in electric ovens or electric apparatuses in question, therefore, for example, the type of cooking to be done, the desired temperature Tz in the chamber 12, the cooking or heating time, and others.

Figure 2:
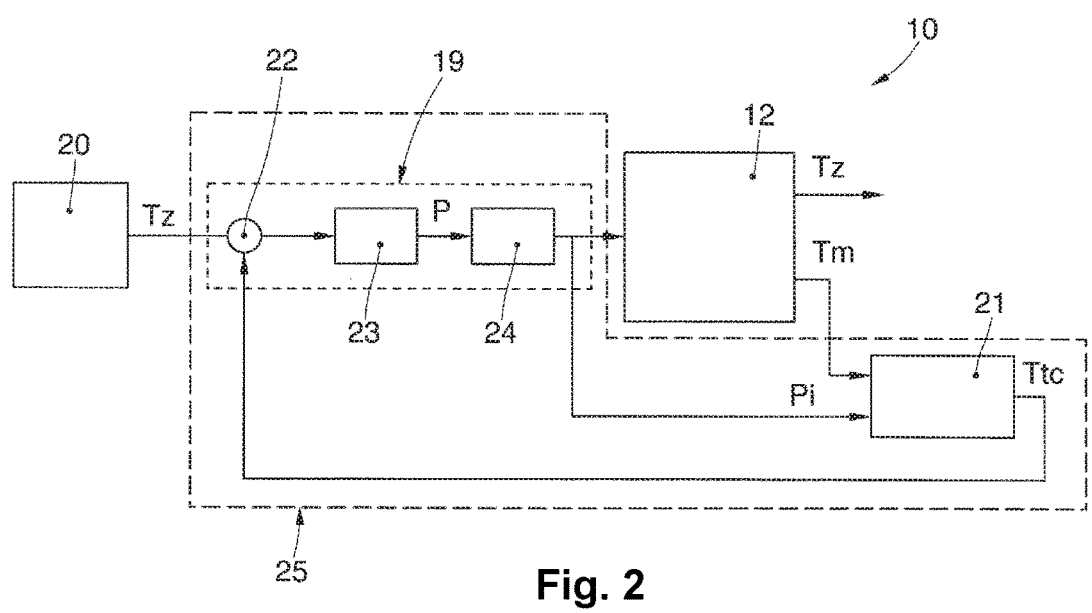
FIG. 2 is a schematic diagram that shows the temperature control method and device according to the invention applied to the electric apparatus of FIG. 1.

FIG. 2 is used to describe embodiments of the temperature control device 25 in which the estimator filter 21 is provided, able to evaluate the temperature in the central zone on a statistical basis, the purpose of which is substantially to supply an estimated temperature TtC based on a series of entrance parameters. In possible implementations, the entrance parameters are actual mean power Pi at which the electric apparatus 10 functions, or its control signal established by the control unit 19, the temperature Tm measured by the temperature sensor 18, and a series of parameters relating to the dynamics of the electric apparatus 10, that is, relating to previous temperature estimates or detections but also relating to its design. The design parameters can relate for example to the geometry of the electric apparatus 10, and hence also to data supplied by the maker. Based on these entrance data Tm, Pi and relating to the dynamics of previous temperature evaluations or estimates, the estimator filter 21 produces a signal relating to the estimated temperature TtC to be controlled, which is the one in the central zone of the electric apparatus 10. The estimator filter can be a digital filter of the control power value polarized with the value of the temperature sensor.

The digital filter has a general formula of a known type and shown here:

$$y(t)+\alpha_1 y(t-1)+ \ldots +\alpha_n y(t-n)=\beta_0 u_1(t)+\beta_1 u_1(t-1)+ \ldots +\beta_k u_1(t-k)+\gamma_0 u_2(t)+\gamma_1 u_2(t-1)+ \ldots +\gamma_j u_2(t-j)$$

Figure 4:
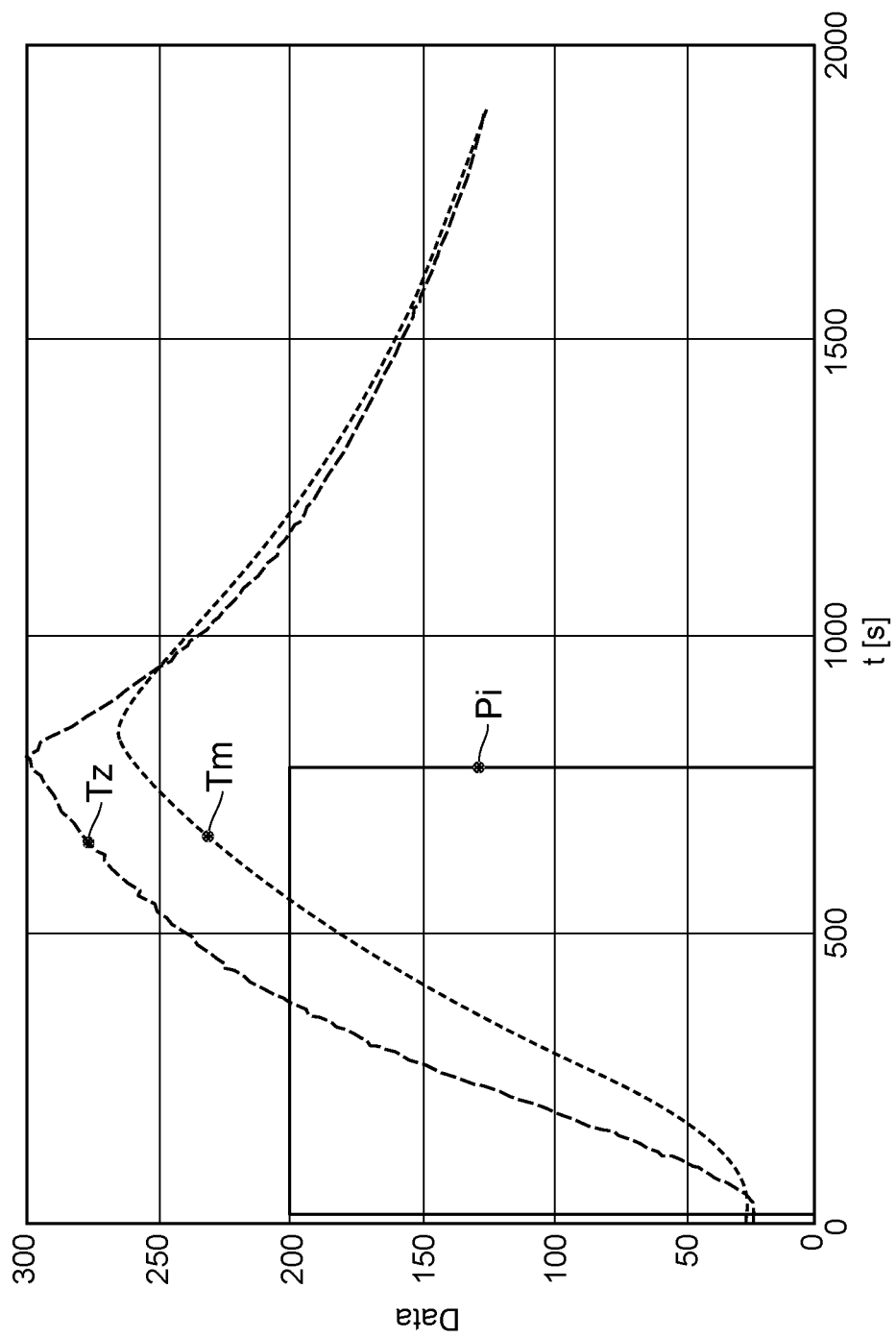
FIG. 4 is a graph of preliminary detection that shows the development of the temperature signal measured as a function of the time and of the power applied.

The sizing of its coefficients as a function of time is established so as to simulate the behavior of the development of the signal of temperature measured Tm as a function of time t and the applied power Pi (see FIG. 4). The drawing shows the difference between the temperature Tz to be controlled at the center of the oven and the temperature measured Tm, and also highlights the dynamic behavior of the system.

In some embodiments, downstream of the estimator filter 21 there is a comparator 22, which symbolizes the fact that the control unit 19 reads and compares the estimated temperature TtC with the desired and/or set temperature Tz. This temperature comparison is used by the control circuit 23 to determine the value of mean power to be supplied in an adequate time basis to the electric heating elements 17 of the electric oven 10.

In some embodiments, a control circuit 23 of the PID type is provided in the control unit 19, or anticipatory or delaying networks, optimum or non-linear controls. Every known control model can be applied to the control circuit 23.

The output of the control circuit 23 is substantially a continuous signal P related to the percentage of the mean power, which can vary from 0 to 100, which is used at entrance to a system to regulate the PWM (Pulse Width Modulation) drive. By means of the system 24, a useful work cycle is obtained that modulates the mean power between minimum and maximum applicable in an adequate time basis, according to the datum found by the control circuit 23. A work cycle of 0 means that the power supplied by the electric heating elements 17 is equal to zero, for a work cycle equal to 100 it means that the power supplied is the maximum.

In substance, in the embodiments described here of the temperature control device 25, instead of establishing when to switch on or off the electric heating elements 17, according to the traditional ON/OFF system, the control unit 19 establishes how much mean power must be supplied to the heating elements 17 in a determinate period of time, based on the cooking mode chosen by the user using the interface 20, hence in short based on the desired temperature Tz.

Embodiments described here therefore provide that the temperature control device 25 makes an estimate of the temperature TtC at the center of the oven based on the value Tm measured by the temperature sensor 18, the power Pi applied at that moment, the dynamic parameters relating to previous evaluation cycles of the estimated temperature TtC in the zone Z at the center of the electric apparatus 10 and possibly the construction parameters of the electric apparatus 10, such as for example the geometry of the oven. In substance, by means of this evaluation of the estimated temperature TtC and considering the set temperature Tz, a percentage of power corresponding to the value of the signal P is determined that is to be applied on the electric heating elements 17 to obtain the set temperature Tz in the central zone Z of the electric apparatus 10. In short, as can be seen in FIG. 2, at the end of the estimation and regulation cycle, the temperature Tz set by the user by means of the interface 20 coincides with the temperature Tz obtained and shown symbolically at exit from the chamber 12 of the electric apparatus 10.

The power established to be supplied by the control unit 19 to the heating elements 17 at instant n is therefore sent to the estimator filter 21 together with the temperature detected by the probe Tm, again at instant n. The estimator filter 21 in its evaluation of a temperature TtC at the center of the oven takes into account, as we said, these parameters and substantially the estimations of temperature TtC and Tm detected at instants n−1, n−2 and so on. Therefore, in this way, the control device offers a precise and reliable estimate of the temperature at the center of the oven, since it uses the knowledge of data of previous evaluations or estimates to provide the actual temperature estimation.

This aspect of the temperature control device 25 according to the present description, obtained by means of the estimator filter 21, determines a substantial reduction in errors of the mean temperature at the center of the oven and on the variations in temperature over the short period. Moreover, by estimating the temperature based on previous evaluations or estimations, the present temperature control device 25 substantially eliminates the delays in intervention caused by variations in temperature of known hysteresis control systems.

Figure 3:
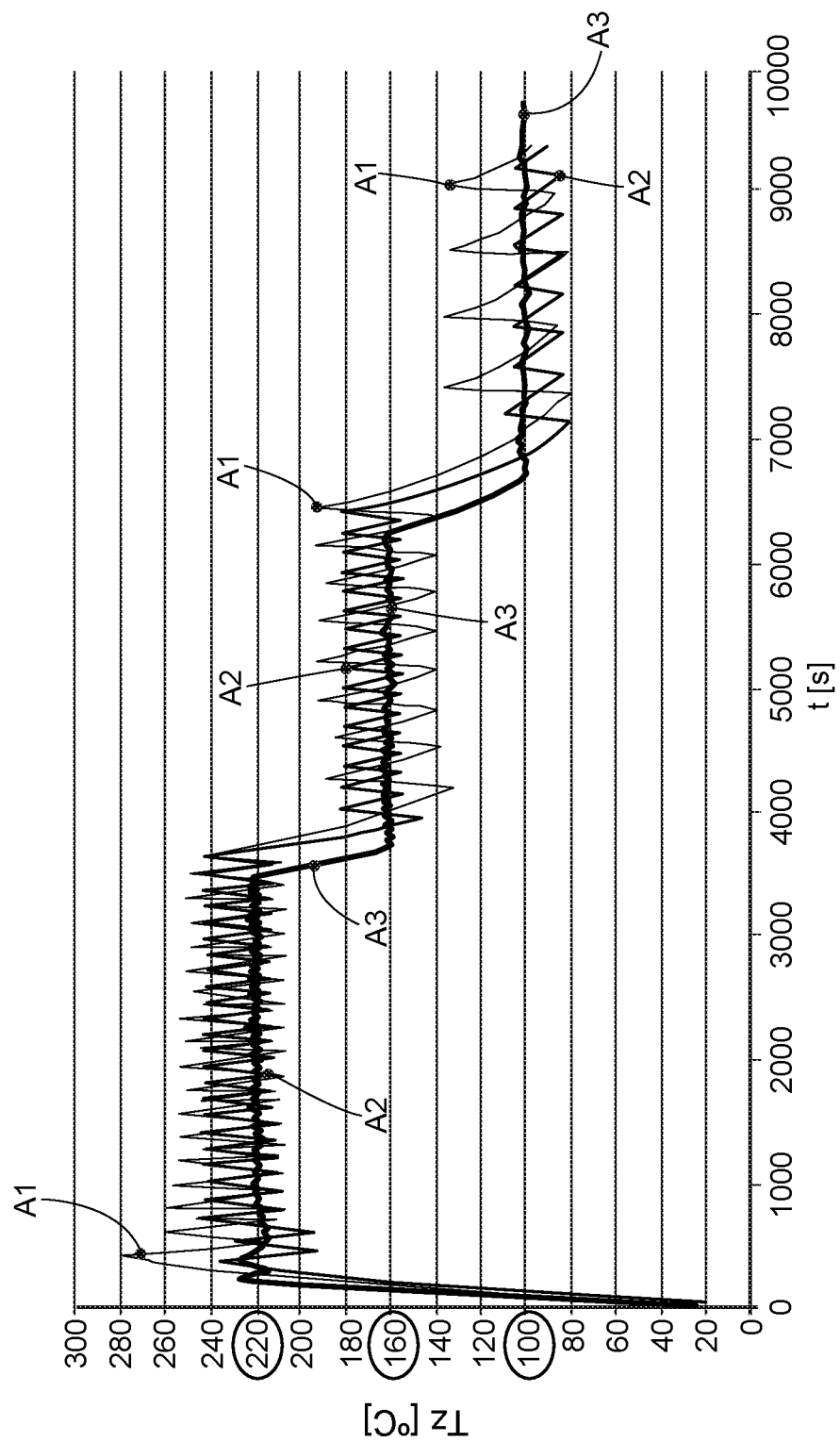
FIG. 3 is a graph comparing the temperature development maintained at the center of the oven between two regulation systems with electronic hysteresis and the device according to the invention.

By means of the present temperature control device 25, iterative and repetitive on several evaluation cycles, the temperature Tz obtained in the central zone Z of the oven by estimating the temperature TtC has a practically constant development as a function of time (see graph in FIG. 3). The time t [s] is shown on the x-axis of the graph, while the temperature Tz [° C.] in the central zone Z of the electric oven 10 is shown on the y-axis. By way of example the cooking temperature desired Tz is 220° C., 160° C. and 100° C.

The developments A1 and A2 of the temperature Tz as a function of time t concern electric ovens that use an electronic hysteresis regulation. The electric oven with development A1 has oscillations that can go from about ±20° C. around the mean value of 220° C. to even ±30° C. for lower temperatures at the center of the oven (see development A1 for the desired temperature of 100° C.). The electric oven with development A2 has a more uniform situation for all three desired temperatures at the center of the oven, but it too has mean oscillations of about ±20° C.

The development A3 obtained using the present temperature control method and device 25 is, on the contrary, practically constant for all three chosen temperatures Tz, i.e., 220° C., 160° C. and 100° C.

This allows to establish precise temperature values Tz at the center of the electric oven and to regulate the power necessary for optimum functioning, so that it is also possible to prepare food at low temperatures, for example it is possible to prepare yoghurt at temperatures of about 36° C., to cook products such as for example meat at temperatures from 50° C. to 100° C., or again to cook meringues in an optimum manner at temperatures below 100° C.

Figure 5:
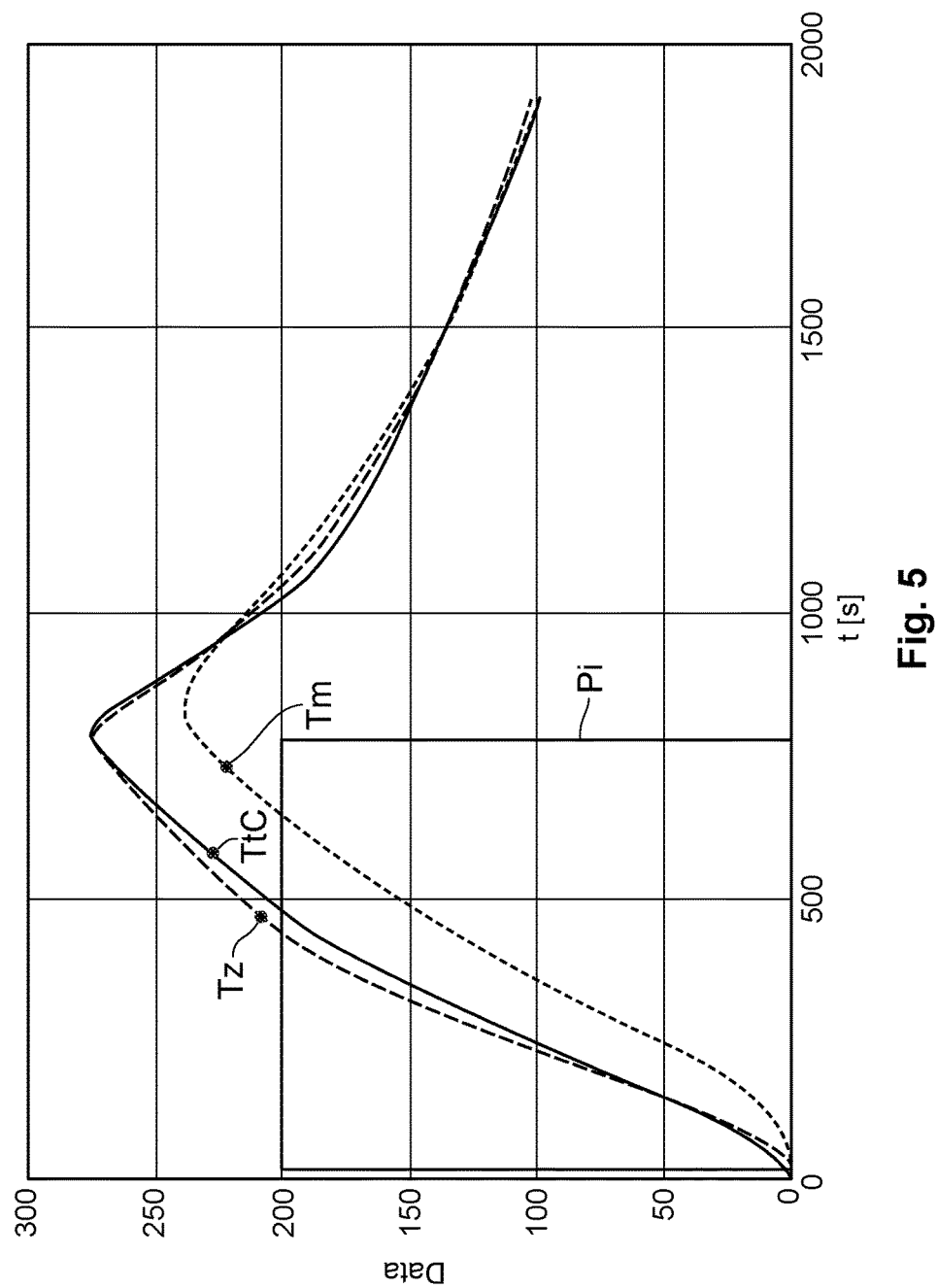
FIG. 5 is a graph showing the exit of the estimator at the entrance to which the power control signal and the temperature measured is applied.

FIG. 5 shows a graph with the developments of the temperature to be controlled Tz, the estimated temperature TtC and the measured temperature Tm as a function of the time t and the power applied Pi. In particular, it should be noted that the exit of the estimator filter 21, equivalent to the estimated temperature TtC, is advantageously similar to the temperature to be controlled at the center of the oven Tz, for any value of power Pi.

Instead of the PWM drive system, electronic components such as TRIAC or suchlike could be used for the system to regulate the power.

It is clear that modifications and/or additions of parts may be made to the electric apparatus 10 for cooking and/or heating food and corresponding temperature control method and device 25 for said electric apparatus 10 as described heretofore, without departing from the field and scope of the present invention.

It is also clear that, although the present invention has been described with reference to some specific examples, a person of skill in the art shall certainly be able to achieve many other equivalent forms of the electric apparatus for cooking and/or heating food and corresponding temperature control method and device for said electric apparatus, having the characteristics as set forth in the claims and hence all coming within the field of protection defined thereby.

The invention claimed is:

1. An electric apparatus for cooking and/or heating food, comprising:
   a chamber able to receive food to be cooked and/or heated,
   electric heating elements associated with said chamber, at least one temperature sensor positioned in a wall of the chamber and configured to measure a temperature of the chamber at the wall in an area of the sensor, a temperature control device provided with a control and power supply unit configured to receive the temperature measured by the sensor and compare it with a desired temperature in a central zone of the chamber;

wherein said temperature control device also comprises at least one estimator filter configured to receive at entrance: the temperature detected, the actual power supplied to the electric heating elements by said control and power supply unit and the data relating to previous temperature estimations and arranged to supply at exit an estimated temperature in the central zone of the chamber;

wherein said control and power supply unit is configured to use the estimated temperature transmitted by the estimator filter to establish a corrected mean power to be supplied by the electric heating elements.

2. The apparatus of claim 1, wherein said estimator filter is a digital filter of a control signal polarized with a value of the temperature sensor.

3. The apparatus of claim 1, wherein said control and power supply unit comprises a control circuit of the PID type.

4. The apparatus of claim 1, wherein said control and power supply unit comprises a power regulation system with PWM drive.

5. The apparatus of claim 1, wherein said control and power supply unit comprises a power regulator of the Triac type.

6. A temperature control device for an electric apparatus for cooking and/or heating food and comprising: a chamber able to receive food to be cooked and/or heated, electric heating elements associated with said chamber, and at least a temperature sensor arranged at a wall of the chamber to measure a temperature in the chamber at the wall, said temperature control device being provided with a control and power supply unit configured to receive the temperature measured by the sensor and to compare it with a desired temperature in a central zone of the chamber;

wherein said temperature control device also comprises at least one estimator filter configured to receive at entrance temperature data detected, an actual power supplied to the electric heating elements by said control and power supply unit and data of previous temperature estimations and arranged to supply at exit an estimated temperature in the central zone of the chamber;

wherein said control and power supply unit is configured to use the estimated temperature transmitted by the estimator filter to establish corrected mean power to be supplied by the electric heating elements.

7. A method to control the temperature in an electric apparatus for cooking and/or heating food provided with electric heating elements, comprising:

setting a desired cooking temperature at a central zone inside the electric apparatus;

measuring an actual temperature inside the electric apparatus only at a peripheral wall thereof;

detecting an actual power supplied by said electric heating elements;

obtaining, by means of an estimator filter, an estimated temperature for the central zone starting from data related to the actual measured temperature, the actual power supplied and any previous estimates of said estimated temperature;

determining, based on a difference between said estimated temperature and the desired cooking temperature, the corrected power to be supplied by a control unit to the electric heating elements.

8. The method of claim 7, wherein the mean power on an adequate time basis to be supplied to the electric heating elements is determined by percentage values varying from 0 to 100.

9. The method of claim 7, wherein the power to be supplied to the electric heating elements is established at every estimation cycle of the estimated temperature.

10. The method of claim 7, wherein constructive parameters of the electric apparatus are considered in the estimation of the temperature, such as an internal geometry, a number and/or a positioning of the electric heating elements and others.

* * * * *